(12) United States Patent
Jang et al.

(10) Patent No.: US 11,955,660 B2
(45) Date of Patent: Apr. 9, 2024

(54) SEPARATOR FOR LITHIUM SECONDARY BATTERY, MANUFACTURING METHOD THEREFOR, AND LITHIUM SECONDARY BATTERY INCLUDING SAME

(71) Applicants: Samsung SDI Co., Ltd., Yongin-si (KR); Samsung Electronics Co., Ltd., Suwon-si (KR)

(72) Inventors: Jungsue Jang, Yongin-si (KR); Byungmin Lee, Yongin-si (KR); Hana Kim, Yongin-si (KR); Myungkook Park, Yongin-si (KR); Seung Rim Yang, Seongnam-si (KR); Bokyung Jung, Suwon-si (KR); Minho Cho, Yongin-si (KR)

(73) Assignees: SAMSUNG SDI CO., LTD., Yongin-si (KR); SAMSUNG ELECTRONICS CO., LTD., Suwon-si (KR)

( * ) Notice: Subject to any disclaimer, the term of this patent is extended or adjusted under 35 U.S.C. 154(b) by 400 days.

(21) Appl. No.: 17/052,500

(22) PCT Filed: Mar. 27, 2019

(86) PCT No.: PCT/KR2019/003544
§ 371 (c)(1),
(2) Date: Nov. 2, 2020

(87) PCT Pub. No.: WO2019/216548
PCT Pub. Date: Nov. 14, 2019

(65) Prior Publication Data
US 2021/0184314 A1 Jun. 17, 2021

(30) Foreign Application Priority Data
May 8, 2018 (KR) .................. 10-2018-0052643

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/403* (2021.01);
(Continued)

(58) Field of Classification Search
CPC ........................................ H01M 50/40–497
See application file for complete search history.

(56) References Cited

U.S. PATENT DOCUMENTS 7,638,241 B2  12/2009  Lee
2012/0270090 A1  10/2012  Shinohara et al.
(Continued)

FOREIGN PATENT DOCUMENTS

CN  102666090 A  9/2012
CN  102473887 B  * 7/2015 ......... B29C 47/0021
(Continued)

OTHER PUBLICATIONS

Machine translation of CN-102473887-B. Obtained from PE2E Search on Mar. 9, 2023 (Year: 2015).*
(Continued)

*Primary Examiner* — Haixia Zhang
(74) *Attorney, Agent, or Firm* — Knobbe, Martens, Olson & Bear LLP (57) ABSTRACT

This application relates to a separator for a lithium secondary battery, a method for manufacturing a separator for a lithium secondary battery, and a lithium secondary battery including same. The separator includes a porous substrate, a heat resistant layer positioned on at least one surface of the porous substrate and including inorganic particles, and a first adhesive layer positioned on the heat resistant layer and including a first organic polymer. The heat resistant layer includes the inorganic particles of 90 wt % to 99 wt % on the basis of total weight, the thickness of the heat resistant layer is 3.5 μm to 7 μm, and the thickness of the first adhesive layer is 0.5 μm to 3.0 μm.

9 Claims, 3 Drawing Sheets (51) Int. Cl.
*H01M 50/403* (2021.01)
*H01M 50/411* (2021.01)
*H01M 50/42* (2021.01)
*H01M 50/426* (2021.01)
*H01M 50/431* (2021.01)
*H01M 50/443* (2021.01)
*H01M 50/446* (2021.01)
*H01M 50/457* (2021.01)
*H01M 50/46* (2021.01)
*H01M 50/491* (2021.01)

(52) U.S. Cl.
CPC ......... *H01M 50/411* (2021.01); *H01M 50/42* (2021.01); *H01M 50/426* (2021.01); *H01M 50/431* (2021.01); *H01M 50/443* (2021.01); *H01M 50/446* (2021.01); *H01M 50/457* (2021.01); *H01M 50/461* (2021.01); *H01M 50/491* (2021.01)

(56) References Cited

U.S. PATENT DOCUMENTS

2013/0302661 A1  11/2013  Kim
2015/0162588 A1   6/2015  Lee
2018/0097216 A1   4/2018  Joo

FOREIGN PATENT DOCUMENTS

| CN | 107438912 A | 12/2017 |
| JP | 2014-203583 A | 10/2014 |
| KR | 10-0727247 B1 | 6/2007 |
| KR | 10-2012-0131311 A | 12/2012 |
| KR | 10-2013-0126445 A | 11/2013 |
| KR | 10-2016-0041492 A | 4/2016 |
| KR | 10-2016-0109669 A | 9/2016 |
| KR | 10-2016-0118966 A | 10/2016 |
| KR | 10-2017-0019522 A | 2/2017 |

OTHER PUBLICATIONS

International Search Report and Written Opinion dated Jul. 3, 2019 in application No. PCT/KR2019/003544, including translation of International Search Report.
Extended European Search Report dated Jan. 4, 2022 in corresponding European application No. 19799645.7, 8 pp.
First office action dated Jun. 2, 2022 in Chinese patent application No. 201980030533.5, 18 pp.
Second Office Action dated Feb. 27, 2023 in corresponding Chinese Patent Application No. 201980030533.5, 15 pp.
Decision of Rejection dated May 25, 2023 in corresponding Chinese patent application No. 201980030533.5, 13 pp.
The notification of the third office action dated Jan. 25, 2024 in corresponding Chinese patent application No. 201980030533.5, 6 pp.

* cited by examiner

Figure 3 to # SEPARATOR FOR LITHIUM SECONDARY BATTERY, MANUFACTURING METHOD THEREFOR, AND LITHIUM SECONDARY BATTERY INCLUDING SAME

CROSS-REFERENCE TO RELATED APPLICATIONS

This application is a national phase of PCT Application No. PCT/KR2019/003544, filed on Mar. 27, 2019, which claims priority to Korean Patent Application No. 10-2018-0052643 filed on May 8, 2018, each of which is hereby incorporated by reference.

TECHNICAL FIELD

A separator for a lithium secondary battery, a manufacturing method therefor, and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. By the way, when the battery is exposed to a high temperature environment due to abnormal behavior, the separator is mechanically shrunk or damaged due to its melting properties at a low temperature. Herein, the positive and negative electrodes may contact each other and cause ignition of the battery. In order to overcome this problem, there is a need for a technology of suppressing the shrinkage of the separator and securing the stability of the battery.

In this regard, a method of coating the separator with a mixture of inorganic particles having high heat resistance and an adhesive organic binder in order to increase the heat resistance has been known. However, conventional methods may not sufficiently secure desired adhesive force and are difficult to comprehensively apply to separators having various sizes and shapes. Accordingly, development of a separator having high heat resistance and excellent adhesive force is required.

DISCLOSURE

Technical Problem

The present invention provides a separator for a lithium secondary battery capable of improving adhesive force and heat resistance, a method for manufacturing the same, and a lithium secondary battery including the same.

Technical Solution

A separator for a lithium secondary battery according to an embodiment includes a porous substrate, a heat resistant layer disposed on at least one surface of the porous substrate, and including inorganic particles, and a first adhesive layer disposed on the heat resistant layer and including a first organic polymer, wherein the heat resistant layer includes 90 wt % to 99 wt % of the inorganic particles relative to the total weight, a thickness of the heat resistant layer is 3.5 µm to 7 µm, and a thickness of the first adhesive layer is 0.5 µm to 3.0 µm.

A method of manufacturing a separator for a lithium secondary battery according to another embodiment includes preparing a heat resistant layer coating liquid including 90 wt % to 99 wt % of inorganic particles and 1 wt % to 10 wt % of a water-soluble polymer binder, preparing a first adhesive layer coating liquid including a first organic polymer binder, and coating the heat resistant layer coating liquid on at least one surface of the porous substrate by a gravure coating method, wherein applying the first adhesive layer coating liquid on the heat resistant layer coating liquid by one of a die coating method, a wire bar coating method, and a spray coating method, and drying the heat resistant layer coating liquid and the first adhesive layer coating liquid at the same time to form a heat resistant layer and a first adhesive layer, wherein the heat resistant layer may be formed to a thickness of 3.5 µm to 7 µm, and the first adhesive layer may be formed to a thickness of 0.5 µm to 3.0 µm.

A lithium secondary battery according to another embodiment includes the aforementioned separator for a lithium secondary battery.

Advantageous Effects

The separator for a lithium secondary battery according to an embodiment may effectively control expansion of an active material and maintain a path of lithium ions to improve battery capacity, and has excellent stability with an electrolyte solution due to reduced side reactions.

A lithium secondary battery according to another embodiment has excellent initial efficiency, charge/discharge characteristics, and cycle-life characteristics.

DESCRIPTION OF SYMBOLS

100, 113: separator
110: porous substrate
120: heat resistant layer
120': first heat resistant layer
130: first adhesive layer
140: second adhesive layer
150: second heat resistant layer
200: negative electrode
300: positive electrode
400: battery case
500: sealing member
1000: lithium secondary battery

MODE FOR INVENTION

Hereinafter, embodiments of the present invention are described in detail with reference to the accompanying drawings. However, in describing the present description, descriptions of functions or configurations that are already known are omitted in order to clarify the gist of the present description.

In order to clearly describe the present description, parts not related to the description have been omitted, and the same reference numerals are assigned to the same or similar constituent elements throughout the specification. In addition, sizes and thicknesses of each configuration shown in the drawings are arbitrarily shown for convenience of description, so the present description is not necessarily limited to what is shown.

In the drawings, the thickness of layers, films, panels, regions, etc., are exaggerated for clarity. And in the drawings, thicknesses of some layers and regions are exaggerated for convenience of description. It will be understood that when an element such as a layer, film, region, or substrate is referred to as being "on" another element, it can be directly on the other element or intervening elements may also be present.

Figure 1:
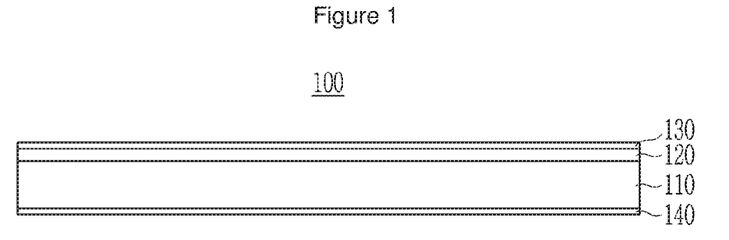
FIG. 1 is a schematic cross-sectional view showing a separator for a lithium secondary battery according to an embodiment.

FIG. 1 is a schematic cross-sectional view of a separator for a lithium secondary battery according to an embodiment. Hereinafter, a separator for a lithium secondary battery according to an embodiment of the present invention is described with reference to FIG. 1.

Referring to FIG. 1, a separator for a lithium secondary battery according to an embodiment includes a porous substrate 110, a heat resistant layer 120, and a first adhesive layer 130.

The porous substrate 110 has a plurality of pores and may be a substrate that is commonly used in an electrochemical device. The porous substrate 110 may be a polymer film formed of one polymer selected from polyolefins such as polyethylene and polypropylene, polyesters such as polyethylene terephthalate and polybutylene terephthalate, polyacetals, polyamides, polyimides, polycarbonates, polyether ether ketones, polyaryl. ether ketones, polyetherimide, polyamideimide, polybenzimidazole, polyethersulfone, polyphenylene oxide, cyclic olefin copolymers, polyphenylene sulfide, polyethylene naphthalate, glass fibers, Teflon, and polytetrafluoro ethylene, or a copolymer or a mixture of two or more of them, but is not limited thereto.

The porous substrate 110 may be, for example, a polyolefin-based substrate including polyolefins, and the polyolefin-based substrate has an improved shutdown function, thereby contributing to improvement of battery safety. The polyolefin-based substrate may be selected from, for example, a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to the olefin resin, or may include a copolymer of an olefin and a non-olefin monomer.

The porous substrate 110 may have a thickness of about 1 μm to 40 μm, for example, 1 μm to 30 μm, 1 μm to 20 μm, 5 μm to 20 μm, 5 μm to 15 μm, or 10 μm to 15 μm.

The heat resistant layer 120 may be disposed on at least one surface of the porous substrate 110 and includes inorganic particles (not shown), and may be formed by a coating method on one surface of the porous substrate 110 by, for example, a gravure coating method.

The inorganic particles may be included in 90 wt % to 99 wt % based on a total weight of the heat resistant layer 120. For example, the inorganic particles may be 92 wt % to 98 wt %, for example, 93 wt % to 98 wt %, 94 wt % to 98 wt %, or 95 wt % to 98 wt % based on the total weight of the heat resistant layer 120. When the heat resistant layer 120 includes inorganic particles as described above, the separator for a lithium secondary battery according to an embodiment may exhibit improved heat resistance, durability, oxidation resistance, and stability.

The heat resistant layer 120 may have a thickness of 3.5 μm to 7 μm. For example, it may be 3.5 μm to 6 μm, or 3.5 μm to 5 μm.

The inorganic particles may be, for example $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. In addition, in addition to the inorganic particles, organic particles including an acrylic compound, an imide compound, an amide compound, or a combination thereof may be further included, but the present invention is not limited thereto.

The inorganic particles may be spherical, plate-shaped, cubic, or amorphous. The inorganic particles may have an average particle diameter of about 1 nm to 2500 nm, within the above range, 100 nm to 2000 nm, or 200 nm to 1000 nm, for example, about 300 nm to 800 nm. The average particle diameter of the inorganic particles may be a particle size ($D_{50}$) corresponding to a volume ratio of 50% in a cumulative size-distribution curve.

The heat resistant layer 120 may further include a water-soluble polymer binder (not shown). The water-soluble binder polymer connects the inorganic particles included in the heat resistant layer 120 in a point-contact or surface-contact manner to prevent the inorganic particles from being desorbed.

The water-soluble polymer binder according to an embodiment may include an acryl-based binder, a cellulose-based binder, a vinylidenefluoride-based binder, or a combination thereof.

As an example, the acryl-based binder may include an acryl-based copolymer including a repeating unit derived from a monomer including a repeating unit derived from an alkyl (meth)acrylate monomer. Examples of the alkyl (meth)acrylate monomer may include one or more selected from n-butyl(meth)acrylate, ethyl(meth)acrylate, propyl (meth)acrylate, t-butyl(meth)acrylate, isobutyl(meth)acrylate, pentyl(meth)acrylate, hexyl(meth)acrylate, heptyl(meth)acrylate, isooctyl(meth)acrylate, octyl(meth)acrylate, nonyl (meth)acrylate, decyl(meth)acrylate, undecyl(meth)acrylate, lauryl (meth)acrylate, methyl(meth)acrylate, isobornyl (meth)acrylate, and cyclohexyl (meth)acrylate, but are not limited thereto. For example, a linear or branched C1 to C20 alkyl (meth)acrylate, or a linear or branched C1 to C20 alkyl (meth)acrylate may be used.

The cellulose-based binder may include, for example, carboxylmethylcellulose, hydroxypropylcellulose, diacetylcellulose, cellulose acetate, cellulose acetate butyrate, cellulose acetate propionate, cyanoethylcellulose, cyanoethyl sucrose, pullulan, carboxymethylcellulose, or salts thereof.

The vinylidene fluoride-based binder may include, for example, a homopolymer including a structural unit alone derived from a vinylidene fluoride monomer, or a copolymer of a structural unit derived from vinylidene fluoride and a structural unit derived from another monomer. The copolymer may be, for example, a structural unit derived from vinylidene fluoride and one or more of structural units derived from chlorotrifluoroethylene, trifluoroethylene, hexafluoropropylene, ethylene tetrafluoride, and ethylene monomers, but is not limited thereto. For example, the copolymer may be a polyvinylidene fluoride-hexafluoropropylene (PVdF-HFP) copolymer including a structural unit derived from a vinylidene fluoride monomer and a structural unit derived from a hexafluoropropylene monomer.

For example, the vinylidenefluoride-based binder may include a polyvinylidene fluoride (PVdF) homopolymer, a polyvinylidene fluoride-hexafluoropropylene (PVdF-HFP) copolymer, or a combination thereof. In this case, adhesive force between the porous substrate 110 and the heat resistant layer 120 is improved, stability of the separator 100 and impregnating properties of the electrolyte are improved, and thus high rate charge/discharge characteristics of the battery may be improved.

In this case, the heat resistant layer 120 may further include a polyvinyl alcohol-based auxiliary binder (not shown). The polyvinyl alcohol-based auxiliary binder may include polyvinyl alcohol, modified polyvinyl alcohol, or a combination thereof. Herein, the modified polyvinyl alcohol may be polyvinyl alcohol modified with a functional group such as a carboxyl group, a sulfonic acid group, an amino group, a silanol group, and a thiol group.

When the heat resistant layer 120 further includes a polyvinyl alcohol-based auxiliary binder, it may crosslink with the water-soluble polymer binder, thereby further increasing heat resistance of the heat resistant layer 120, and reducing moisture content due to a dehydration reaction by crosslinking.

The polyvinyl alcohol-based auxiliary binder may be included in an amount of 0.05 wt % to 2 wt % based on a total weight of the heat resistant layer 120. When the polyvinyl alcohol-based auxiliary binder is included within the above range, heat resistance of the separator for a lithium secondary battery according to an embodiment may be further improved, and moisture content in the heat resistant layer 120 may be reduced.

The first adhesive layer 130 may be disposed on the heat resistant layer 120 and may include a first organic polymer (not shown). The first organic polymer may be a particulate polymer or a non-particle polymer.

The particle-type polymer may have a diameter of 100 nm to 600 nm. For example, it may be 100 nm to 500 nm, for example, 100 nm to 400 nm, 150 nm to 300 nm, 150 nm to 250 nm, for example, 150 nm to 200 nm. The diameter may be an average particle diameter of the particle-type polymer, for example, may be a particle size ($D_{50}$) corresponding to a volume ratio of 50% in a cumulative size-distribution curve. When the particle-type polymer has the above diameter, the thickness of the first adhesive layer 130 may be easily controlled when forming the first adhesive layer 130 on the separator 100 for a lithium secondary battery by a coating method.

The particle-type polymer may have a weight average molecular weight of 100,000 g/mol to 1,000,000 g/mol, for example, 200,000 g/mol to 800,000 g/mol, for example 400,000 g/mol to 600,000 g/mol. When the weight average molecular weight of the particle-type polymer satisfies the above range, the particle-type polymer and the separator 100 for a lithium secondary battery including the particle-type polymer may exhibit excellent adhesive force, heat resistance, air permeability, and oxidation resistance. The weight average molecular weight may be polystyrene-reduced average molecular weight measured by gel permeation chromatography.

The non-particle-type polymer is provided in a liquid form, and may be applied directly onto the heat resistant layer 120 solution in a coating method to form the first adhesive layer 130. For example, the coating method may be die coating, wire bar coating, or spray coating.

In addition, the first adhesive layer 130 may have a thickness of 0.5 μm to 3.0 μm, for example, 0.5 μm to 2.0 μm, 0.5 μm to 1.5 μm, or 0.5 μm to 1.0 μm. Since the first adhesive layer 130 is formed by the coating method as described above, it may be formed to have a thin thickness not exceeding 3.0 μm. Therefore, while contributing to peeling-off of the separator 100 of the lithium secondary battery, air permeability may be maintained, and high adhesive force to the electrode may be secured without deteriorating the performance of the lithium secondary battery.

Meanwhile, since the first adhesive layer 130 is coated on the heat resistant layer 120 by a die coating method as described above, the first adhesive layer 130 may be coated more evenly and thus may have a low surface roughness value. For example, the surface roughness of the first adhesive layer 130 may be 0.1 μm to 1.0 μm. For example, the first adhesive layer 130 may have a surface roughness of 0.2 μm to 0.8 μm, 0.3 μm to 0.7 μm, or 0.3 μm to 0.6 μm.

The surface roughness is a value obtained by measuring the surface roughness of the surface of the first adhesive layer 130 exposed to the outside in FIG. 1. Surface roughness is measured with a surface profiler and calculated by the Ten-Spot Average Roughness (RZ) method.

In addition, as the heat resistant layer 120 includes an inorganic material as a main component, particle sizes of the inorganic material may affect the surface roughness, and accordingly, the surface roughness of the heat resistant layer 120 may be 1.0 μm to 4.0 μm, which is somewhat uneven. On the other hand, when the first adhesive layer 130 is coated on the heat resistant layer 120, the first adhesive layer 130 does not include inorganic materials, and thus may have a relatively even surface.

Meanwhile, in order to form the heat resistant layer 120 according to an exemplary embodiment, the coating liquid including inorganic particles may have a viscosity of 2 cp to 3000 cp. For example, the coating liquid for forming the heat resistant layer 120 may have a viscosity of 2 cp to 2000 cp, for example, 10 cp to 1000 cp or 100 cp to 1000 cp. When the coating liquid has a viscosity in the above range, an interface between the heat resistant layer 120 and the first adhesive layer 130 to be described later may be more clearly formed. Therefore, the inorganic particles included in the heat resistant layer 120 may not be diffused into the first adhesive layer 130 and may exist in the heat resistant layer 120 alone, so that the first adhesive layer 130 does not include inorganic particles to secure adhesive force.

Referring to FIG. 1, the separator for a lithium secondary battery according to an embodiment may further include a second adhesive layer 140. The second adhesive layer 140 may be disposed on the other surface of the porous substrate 110 opposite to the one surface of the porous substrate 110 and may include a second organic polymer. In this case, the second organic polymer may be the same as or different from the first organic polymer described above.

The separator for a lithium secondary battery further including the second adhesive layer 140 may secure adhesive force to the surface corresponding to the other surface of the porous substrate 110, so that when assembled into a lithium secondary battery later, the electrode adhesive force may be further improved.

Figure 2:
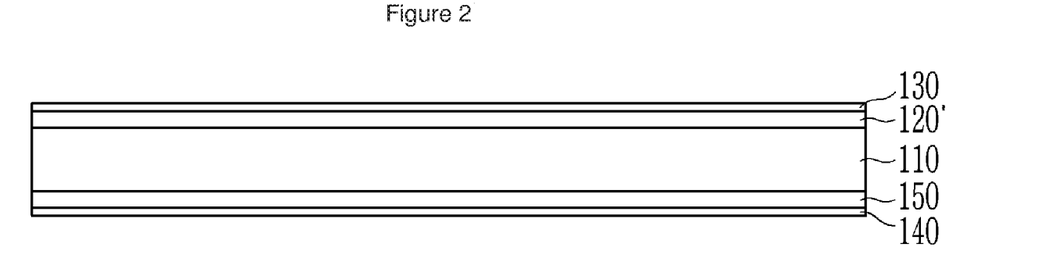
FIG. 2 is a schematic cross-sectional view showing a separator for a lithium secondary battery according to an exemplary variation of FIG. 1.

FIG. 2 is a schematic cross-sectional view showing a separator for a lithium secondary battery according to an exemplary variation of FIG. 1. Referring to FIG. 2, a separator for a lithium secondary battery according to an exemplary variation may include a first heat resistant layer 120' on one surface of the porous substrate 110 and between the porous substrate 110 and the first adhesive layer and a second heat resistant layer 150 on the other surface of the porous substrate 110 and between the porous substrate 110 and the second adhesive layer 140.

The first heat resistant layer 120' and the second heat resistant layer 150 may respectively include inorganic particles, which are specifically the same type of the inorganic particles as included in the heat resistant layer 120. The inorganic particles included in the first heat resistant layer 120' and the second heat resistant layer 150 may be the same or different. As shown in FIG. 2, the separator for a lithium secondary battery further including the second heat resistant layer 150 may secure much higher heat resistance.

The separator 100 for a lithium secondary battery according to an embodiment has excellent heat resistance. For example, the separator 100 may have a shrinkage rate of less than or equal to 2% or less than or equal to 1% at a high temperature. For example, after allowing the separator 100 to stand at 190° C. to 210° C. for 20 minutes to 40 minutes, shrinkage rates in the vertical direction and the horizontal direction are respectively less than or equal to 2%. For example, after allowing the separator 100 to stand at 200° C. for 30 minutes, shrinkage rates in the vertical direction and the horizontal direction are respectively less than or equal to 2%. A thickness ratio of the heat resistant layer 120 relative to the porous substrate 110 may be 0.05 to 0.5, for example, 0.05 to 0.4, or 0.1 to 0.4. Herein, the separator 100 including the porous substrate 110 and the heat resistant layer 120 may exhibit excellent air permeability, heat resistance, adhesive force, and the like.

In addition, the separator 100 for a lithium secondary battery according to an embodiment may be neither broken nor deformed but keep a stable shape at a high temperature of greater than or equal to 200° C., for example, 200° C. to 250° C.

Figure 3:
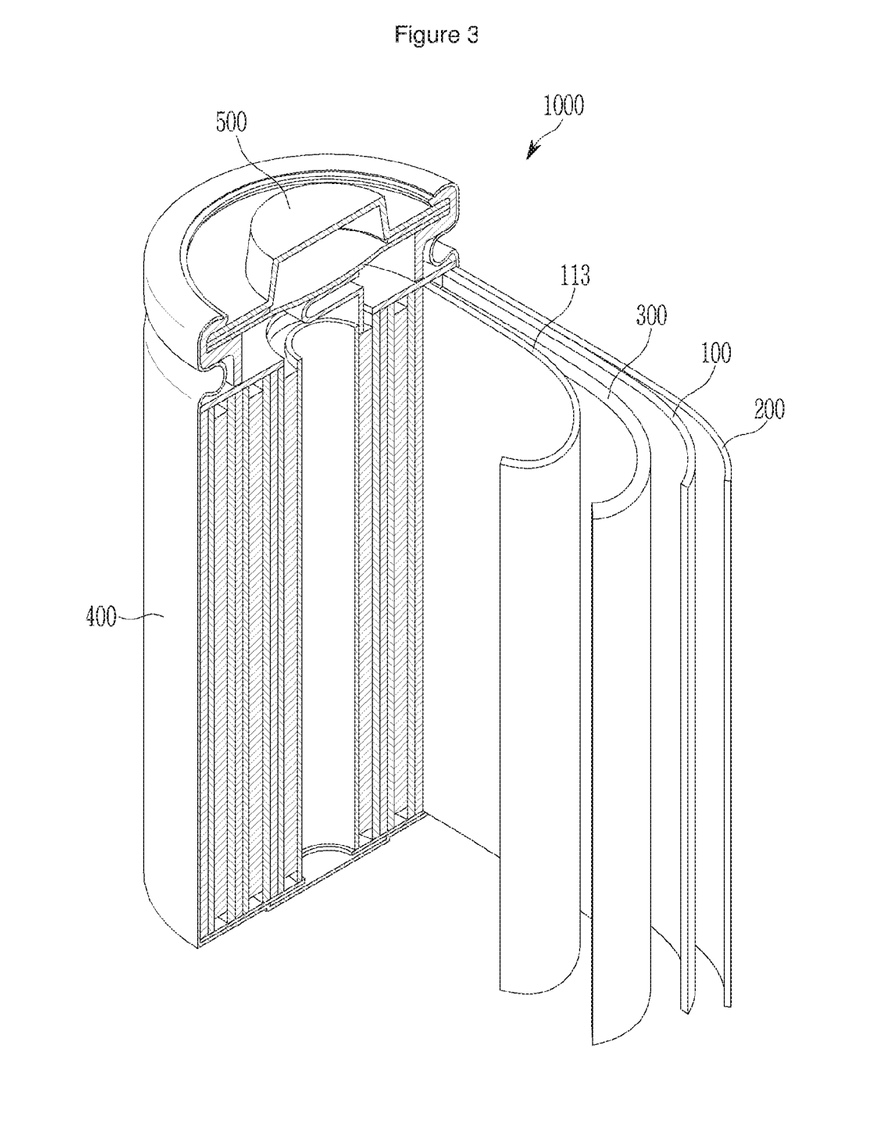
FIG. 3 is a schematic view of a lithium secondary battery according to another embodiment.

When the separator 100 for a lithium secondary battery according to an embodiment is assembled into a lithium secondary battery, excellent adhesive force to the positive electrode 300 or the negative electrode 200 may be obtained. The separator 100 may have peel strength of greater than or equal to 0.1 gf/mm, for example, 0.1 gf/mm to 2.0 gf/mm, for example, 0.2 gf/mm to 1.0 gf/mm.

For example, after passing the separator 100 through rolls having an interval of 0 μm under a pressure of 250 kgf at 150 mm/sec in an 80° C. chamber, peel strength thereof is greater than or equal to 0.1 gf/mm, for example, 0.1 gf/mm to 2.0 gf/mm, or for example, 0.2 gf/mm to 1.0 gf/mm.

The separator 100 for a lithium secondary battery according to an embodiment may exhibit excellent air permeability, for example, less than 1000 sec/100 cc, for example, less than 300 sec/100 cc, for example, less than or equal to 200 sec/100 cc, or less than or equal to 150 sec/100 cc. In other words, the air permeability may be less than 40 sec/100 cc·1 μm, for example, less than or equal to 30 sec/100 cc·1 μm, or less than or equal to 25 sec/100 cc·1 μm per unit thickness. Herein, the air permeability means time (seconds) taken until 100 cc of air pass the unit thickness of the separator. The permeability per unit thickness may be obtained by measuring air permeability with respect to entire thickness of the separator and then, dividing it with the thickness.

In the above, the separator for lithium secondary batteries has been described. Hereinafter, a lithium secondary battery including the separator for a lithium secondary battery is described.

The lithium secondary battery may be classified as a lithium ion battery, a lithium ion polymer battery, and a lithium polymer battery according to the presence of a separator and the type of an electrolyte used therein. The lithium secondary battery may have a variety of shapes and sizes and thus, may include a cylindrical, prismatic, coin-type, or pouch-type battery and a thin film type or a bulky type in size. Structures and manufacturing methods for lithium ion batteries pertaining to this disclosure are well known in the art.

Herein, as an example of a lithium secondary battery, a cylindrical lithium secondary battery is exemplarily described. FIG. 3 is an exploded perspective view of a lithium secondary battery according to another embodiment of the present invention. Referring to FIG. 3, the lithium secondary battery 1000 includes a negative electrode 200, a positive electrode 300, a separator 100 disposed between the negative electrode 200 and the positive electrode 300, and the separator 100, a battery container 400 including an electrolyte solution (not shown) impregnated in the battery container 400, and a sealing member 500 for sealing the battery container 400.

Since the description of the separator 100 is the same as that described above, redundant description will be omitted.

The negative electrode 200 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shaped, flake-shaped, spherically shaped, or fiber-shaped natural graphite or artificial graphite. Examples of the amorphous carbon may be soft carbon or hard carbon, a mesophase pitch carbonized product, fired coke, and the like. The lithium metal alloy may be an alloy of—lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode 200 may be the same as the binder and conductive material of the positive electrode 300.

The positive electrode 300 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. For example, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurea, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The positive electrode 200 and the negative electrode 300 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between the negative electrode 200 and positive electrode 300 therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

DETAILED DESCRIPTION OF THE EMBODIMENTS

Hereinafter, the above aspects of the present disclosure are illustrated in more detail with reference to examples. However, these examples are exemplary, and the present disclosure is not limited thereto.

EXAMPLES

Example 1

48.61 g pf alumina (Sumitomo Corp.), 0.97 g of carboxymethyl cellulose sodium salt (Sigma-Aldrich Co., Ltd.), 0.42 g of polyvinyl alcohol (Daejung Chemicals & Metals Co., Ltd.), and 50 g of DI water were mixed to prepare a coating liquid for the heat resistant layer 120 having viscosity of 600 cp.

9.68 g of polyvinylidene fluoride (Solyvay), 0.32 g of polyvinyl alcohol (Daejung Chemicals & Metals Co., Ltd.), and 90 g of DI water were mixed to prepare a coating liquid for the adhesive layer 130.

On a 12 μm-thick polyethylene substrate (SKI), the heat resistant layer coating liquid was coated to be 4 μm thick in a gravure coating method, and subsequently, the adhesive layer coating liquid is coated to be 0.6 μm thick on the heat resistant layer coating liquid in a die coating method. Subsequently, the heat resistant layer coating liquid and the adhesive layer coating liquid were simultaneously dried to manufacture a separator for a lithium secondary battery cell.

After the drying, the heat resistant layer had a thickness of 4 μm, and the adhesive layer had a thickness of 0.6 μm.

Example 2

A first heat resistant layer coating liquid was coated to be 2 μm thick on one surface of a 12 μm-thick polyethylene substrate (SKI) in the gravure coating method, a second heat resistant layer coating liquid was coated to be 2 μm thick on the other surface of the polyethylene substrate (SKI) in the gravure coating method, and subsequently, a first adhesive layer coating liquid was coated to be 0.6 μm thick on the first heat resistant layer coating liquid in the die coating method, and a second adhesive layer coating liquid was coated to be 0.6 μm thick on the second heat resistant layer coating liquid in the die coating method.

Herein, the first and second heat resistant layer coating liquids were coated according to the same method as used to coat the heat resistant layer coating liquid of Example 1, and the first and second adhesive layer coating liquids were coated according to the same method as used to coat the adhesive layer coating liquid of Example 1.

Subsequently, the first heat resistant layer coating liquid and the first adhesive layer coating liquid and also, the second heat resistant layer coating liquid and the second adhesive layer coating liquid were simultaneously dried to manufacture a separator for a lithium secondary battery cell.

After the drying, the first heat resistant layer and the second heat resistant layer had each thickness of 2 μm, and the first adhesive layer and the second adhesive layer had each thickness of 0.6 μm.

Comparative Example 1

The heat resistant layer coating liquid according to Example 1 was coated to be 2 μm thick on a 12 μm-thick polyethylene substrate (SKI) in the gravure coating method, and subsequently, the adhesive layer coating liquid according to Example 1 was coated to be 0.6 μm thick on the heat resistant layer coating liquid in the die coating method. Subsequently, the heat resistant layer coating liquid and the adhesive layer coating liquid were simultaneously dried to manufacture a separator for a lithium secondary battery cell.

After the drying, the heat resistant layer had a thickness of 2 μm, and the adhesive layer had a thickness of 0.6 μm.

Comparative Example 2

The heat resistant layer coating liquid according to Example 1 was coated to be 4 μm thick on a 12 μm-thick polyethylene substrate (SKI) in the gravure coating method, and subsequently, the adhesive layer coating liquid according to Example 1 was coated to be 0.4 μm thick on the heat resistant layer coating liquid in the die coating method. Subsequently, the heat resistant layer coating liquid and the adhesive layer coating liquid were simultaneously dried to manufacture a separator for a lithium secondary battery cell.

After the drying, the heat resistant layer was 4 μm thick, and the adhesive layer was 0.4 μm thick.

Comparative Example 3

A mixture of 48.61 g of alumina (Sumitomo Corp.), 0.97 g of carboxylmethyl cellulose sodium salt (Sigma-Aldrich Co., Ltd.) and 0.42 g of polyvinyl alcohol (Daejung Chemicals & Metals Co., Ltd.), and a mixture of 9.68 g of polyvinylidene fluoride (Solvay), 0.32 g of polyvinyl alcohol (Daejung Chemicals & Metals Co., Ltd.) and 40 g of DI water were mixed to prepare a coating liquid.

The coating liquid was coated to be 4.6 μm thick on a 12 μm-thick polyethylene group in the gravure coating method and dried to manufacture a separator for a lithium secondary battery cell.

After the drying, the coating layer was 4.6 μm thick.

Comparative Example 4

48.61 g of alumina (Sumitomo Corp.), 0.97 g of carboxylmethyl cellulose sodium salt (Sigma-Aldrich Co., Ltd.), 0.42 g of polyvinyl alcohol (Daejung Chemicals & Metals Co., Ltd.), and 50 g of DI water were mixed to prepare a heat resistant layer coating liquid having viscosity of 600 cp.

20 g of alumina, 9.68 g of polyvinylidene fluoride (Solvay), 0.32 g of polyvinyl alcohol (Daejung Chemicals & Metals Co., Ltd.), and 70 g of DI water were mixed to prepare an adhesive layer coating liquid.

On a 12 μm-thick polyethylene substrate, the heat resistant layer coating liquid was coated to be 4 μm thick in the gravure coating method, subsequently, the adhesive layer coating liquid was coated to be 0.6 μm thick in the die coating method on the heat resistant layer coating liquid, and then, the heat resistant layer coating liquid and the adhesive layer coating liquid were simultaneously dried to manufacture a separator for a lithium secondary battery cell.

After the drying, the heat resistant layer was 4 μm thick, and the adhesive layer was 0.6 μm thick.

In addition, the heat resistant layer included 97 wt % of inorganic particles, and the adhesive layer included 67 wt % of inorganic particles.

Comparative Example 5

48.61 g of alumina (Sumitomo Corp.), 0.97 g of carboxylmethyl cellulose sodium salt (Sigma-Aldrich Co., Ltd.), 0.42 g of polyvinyl alcohol (Daejung Chemicals & Metals Co., Ltd.), and 450 g of DI water were mixed to prepare a heat resistant layer coating liquid having viscosity of 60 Cp.

9.68 g of polyvinylidene fluoride (Solvay), 0.32 g of polyvinyl alcohol (Daejung Chemicals & Metals Co., Ltd.), and 120 g of DI water were mixed to prepare an adhesive layer coating liquid.

On a 12 μm-thick polyethylene substrate, the heat resistant layer coating liquid was coated to be 4 μm thick in the die coating method, subsequently, the adhesive layer coating liquid was coated to be 0.6 μm thick on the heat resistant layer coating liquid in the die coating method, and the heat resistant layer coating liquid and the adhesive layer coating liquid were simultaneously dried to manufacture a separator for a lithium secondary battery cell.

After the drying, the coating layer was 4.6 μm thick.

Table 1 shows a thickness and a content of each layer, presence or absence of interface, and viscosity of the heat resistant layer coating liquids in the separators for a lithium secondary battery cell according to Examples 1 and 2, Comparative Examples 1 to 5.

TABLE 1

| | Thickness of heat resistant layer (μm) | Thickness of adhesive layer (μm) | Thickness of coating layer (μm) | Surfaces roughness of first adhesive layer (μm) | Content of heat resistant layer (wt %) | | Content of adhesive layer (wt %) | | Viscosity of heat resistant layer coating liquid |
|---|---|---|---|---|---|---|---|---|---|
| | | | | | Inorganic particle | Binder | Inorganic particle | Organic polymer | |
| Example 1 | 4 | 0.6 | 4.6 | 0.5 | 97 | 3 | 0 | 100 | 600 |
| Example 2 | 4 | 1.2 | 5.2 | 0.5 | 97 | 3 | 0 | 100 | 600 |
| Comp. Ex. 1 | 2 | 0.6 | 2.6 | 0.5 | 97 | 3 | 0 | 100 | 600 |
| Comp. Ex. 2 | 4 | 0.4 | 4.4 | 0.5 | 97 | 3 | 0 | 100 | 600 |
| Comp. Ex. 3 | — | — | 4.6 | 1.5 | — | — | — | — | 600 |
| Comp. Ex. 4 | 4 | 0.6 | 4.6 | 0.5 | 97 | 3 | 67 | 33 | 600 |
| Comp. Ex. 5 | — | — | 4.6 | 1.5 | 97 | 3 | 0 | 100 | 60 |

Evaluation Examples

Heat Resistance

The separators for a lithium secondary battery according to Examples 1 and 2 and Comparative Examples 1 to 5 were respectively cut into a size of 10 cm×10 cm and then, marked with a dot in the middle of the machine direction (MD) and each dot 2.5 cm left and right from the center and in the same way, marked with dots in the transverse direction (TD) to prepare the samples. After setting a conventional oven with forced circulation at 200° C. and waiting until the temperature was stably maintained, the samples were put therein and allowed to stand for 10 minutes. Then, the samples were taken out to measure a length ($L_1$) after the heat treatment, which was used to calculate heat shrinkages along with a length ($L_0$) before the heat treatment according to Calculation Equation 1. In addition, a heat shrinkage of each sample was measured after allowed to stand at 250° C. for 15 minutes, and the results are shown in Table 2.

Shrinkage rate (%)=[($L_O$-$L_1$)/$L_O$]×100    [Calculation Equation 1]

Electrode Adhesive Force $LiCoO_2$, polyvinylidene fluoride, and carbon black in a weight ratio of 96:2:2 were added to an N-methylpyrrolidone solvent to prepare slurry. The slurry was coated on an aluminum thin film and then, dried and compressed to manufacture a positive electrode.

Graphite, polyvinylidene fluoride, and carbon black in a weight ratio of 98:1:1 were added to an N-methylpyrrolidone solvent to prepare slurry. The slurry was coated on a copper foil and then, dried and compressed to manufacture a negative electrode.

The separators for a lithium secondary battery according to Examples 1 and 2 and Comparative Examples 1 to 5 were prepared to have a size of 10 cm×10 cm and respectively disposed between positive and negative electrodes having a size of 9 cm×9 cm and then, passed through rolls under a pressure of 250 kgf at 150 mm/sec in an 80° C. chamber to adhere the separators to electrode plates. The separators adhered to the electrodes were cut to have a width of 25 mm and a length of 50 mm to prepare samples. In the samples, the separator was detached 10 mm to 20 mm away from the negative electrode plate, fixed into an upper grip, while the negative electrode plate was fixed into a lower grip with an interval between two grips 20 mm, and then, elongated and peeled off in a direction of 180°. Herein, the peeling speed was 20 mm/min, and a force required to peel 40 mm was three times measured and then, averaged. The results are shown in Table 2.

Presence or Absence of Interface

The presence or absence of interface between heat resistant layer/adhesive layer was evaluated by using a content difference of greater than or equal to 70% between fluorine elements (F) in an adhesive binder and metal elements (Al) included in heat resistant layer inorganic as a criteria for determining the presence of the interface through XPS depth profile.

TABLE 2

| | Heat resistance | | Electrode adhesive | Presence or absence of interface between heat |
| --- | --- | --- | --- | --- |
| | MD (%) | TD (%) | force (gf/mm) | resistant layer/adhesive layer |
| Example 1 | 2 | 2 | 0.2 | ○ |
| Example 2 | 2 | 2 | 0.2 | ○ |
| Comparative Example 1 | 35 | 35 | 0.2 | ○ |
| Comparative Example 2 | 2 | 2 | 0.05 | ○ |
| Comparative Example 3 | 10 | 10 | 0.02 | X |
| Comparative Example 4 | 2 | 2 | 0.03 | ○ |
| Comparative Example 5 | 10 | 10 | 0.02 | X |

Referring to Table 2, the separators for a lithium secondary battery according to Examples 1 and 2 exhibited both improved heat resistance and electrode adhesive force.

Hereinbefore, the certain exemplary embodiments of the present invention have been described and illustrated, however, it is apparent to a person with ordinary skill in the art that the present invention is not limited to the exemplary embodiment as described, and may be variously modified and transformed without departing from the spirit and scope of the present invention. Accordingly, the modified or transformed exemplary embodiments as such may not be understood separately from the technical ideas and aspects of the present invention, and the modified exemplary embodiments are within the scope of the claims of the present invention.

The invention claimed is:

1. A separator for a lithium secondary battery, comprising:
a porous substrate;
a heat resistant layer disposed on at least one surface of the porous substrate, and including inorganic particles, wherein the heat resistant layer is prepared from a heat resistant layer coating liquid having a viscosity of 100 cp to 1000 cp;
a water-soluble polymer and a polyvinyl alcohol-based auxiliary binder, wherein the water-soluble polymer comprises an acryl-based binder, a cellulose-based binder, a vinylidenefluoride-based binder, or a combination thereof; and
a first adhesive layer disposed on the heat resistant layer and including a first organic polymer,
wherein the heat resistant layer includes 90 wt % to 99 wt % of the inorganic particles relative to a total weight of the heat resistant layer,
wherein a thickness of the heat resistant layer is 3.5 μm to 7 μm,
wherein a thickness of the first adhesive layer is 0.5 μm to 3.0 μm,
wherein a surface roughness of an interface formed between the heat resistant layer and the first adhesive layer is 1.0 μm to 4.0 μm,
wherein a surface roughness of one surface of the first adhesive layer exposed to the outside is 0.1 μm to 1.0 μm, and
wherein a peel strength between the electrodes and the separator is 0.1 gf/mm to 2.0 gf/mm.

2. The separator of claim 1, wherein the first organic polymer comprises a particle-type polymer or a non-particle-type polymer.

3. The separator of claim 2, wherein the particle-type polymer has an average particle diameter of 100 nm to 600 nm.

4. The separator of claim 2, wherein the first organic polymer comprises an acryl-based polymer, a vinylidene-fluoride-based polymer, or a combination thereof.

5. The separator of claim 1, further comprising a second adhesive layer disposed on the other surface of the porous substrate opposite to the one surface of the porous substrate and including a second organic polymer.

6. The separator of claim 5, wherein the second organic polymer is the same as the first organic polymer.

7. The separator of claim 5, wherein the heat resistant layer comprises:
- a first heat resistant layer on one surface of the porous substrate and between the porous substrate and the first adhesive layer; and
- a second heat resistant layer on the other surface of the porous substrate and between the porous substrate and the second adhesive layer, wherein the second heat resistant layer comprises inorganic particles.

8. A lithium secondary battery comprising the separator of claim 1.

9. The separator of claim 5, wherein the second organic polymer is different from the first organic polymer.

* * * * *

UNITED STATES PATENT AND TRADEMARK OFFICE
CERTIFICATE OF CORRECTION

| | |
|---|---|
| PATENT NO. | : 11,955,660 B2 |
| APPLICATION NO. | : 17/052500 |
| DATED | : April 9, 2024 |
| INVENTOR(S) | : Jungsue Jang et al. |

It is certified that error appears in the above-identified patent and that said Letters Patent is hereby corrected as shown below:

In the Specification

In Column 3, Line 32, delete "polyaryl." and insert -- polyaryl --.

In Column 8, Line 48, delete "TI," and insert -- Tl, --.

In Column 10, Line 29, delete "(Solyvay)," and insert -- (Solvay), --.

Signed and Sealed this
First Day of October, 2024

Katherine Kelly Vidal
*Director of the United States Patent and Trademark Office*